US008015325B2

(12) United States Patent
Nakayama et al.

(10) Patent No.: US 8,015,325 B2
(45) Date of Patent: Sep. 6, 2011

(54) STORAGE SUBSYSTEM AND STORAGE CONTROLLER HAVING MEMORY WHICH STORES MANAGEMENT INFORMATION INDICATING CORRESPONDING RELATIONS BETWEEN PROCESSORS AND IDENTIFIES OF LOGICAL UNITS

(75) Inventors: Shinichi Nakayama, Chigasaki (JP); Shizuo Yokohata, Naka-gun (JP)

(73) Assignee: Hitachi, Ltd., Tokyo (JP)

( * ) Notice: Subject to any disclaimer, the term of this patent is extended or adjusted under 35 U.S.C. 154(b) by 375 days.

(21) Appl. No.: 12/245,937

(22) Filed: Oct. 6, 2008

(65) Prior Publication Data

US 2009/0044000 A1 Feb. 12, 2009

Related U.S. Application Data

(63) Continuation of application No. 11/606,138, filed on Nov. 30, 2006, now Pat. No. 7,461,245, which is a continuation of application No. 10/941,960, filed on Sep. 16, 2004, now Pat. No. 7,213,141, which is a continuation of application No. 10/418,360, filed on Apr. 18, 2003, now Pat. No. 7,099,962, which is a continuation of application No. 09/608,151, filed on Jun. 30, 2000, now Pat. No. 6,725,293.

(30) Foreign Application Priority Data

Dec. 14, 1999 (JP) .................................... 11-353806

(51) Int. Cl.
*G06F 3/00* (2006.01)

(52) U.S. Cl. ......................................... 710/36; 710/311

(58) Field of Classification Search ............. 710/36-39, 710/306-311; 711/163-164, 113-115; 713/600, 713/168; 714/6

See application file for complete search history.

(56) References Cited

U.S. PATENT DOCUMENTS

| | | | | |
|---|---|---|---|---|
| 4,814,982 | A | 3/1989 | Weir | 364/200 |
| 4,901,232 | A | 2/1990 | Harrington et al. | 364/200 |
| 4,914,656 | A | 4/1990 | Dunphy, Jr. | |
| 4,989,205 | A | 1/1991 | Dunphy, Jr. | |
| 5,077,736 | A | 12/1991 | Dunphy, Jr. | |
| 5,124,987 | A | 6/1992 | Milligan et al. | |
| 5,163,096 | A | 11/1992 | Clark et al. | |
| 5,210,844 | A | 5/1993 | Shimura et al. | |
| 5,237,668 | A | 8/1993 | Blandy et al. | |
| 5,239,632 | A | 8/1993 | Larner | |
| 5,269,011 | A | 12/1993 | Yanai et al. | |

(Continued)

FOREIGN PATENT DOCUMENTS

EP 0645702 A1 3/1995

(Continued)

*Primary Examiner* — Raymond N Phan

(74) *Attorney, Agent, or Firm* — Brundidge & Stanger, P.C.

(57) ABSTRACT

A storage subsystem and a storage controller adapted to take advantage of high data transfer rates of fiber channels while offering enhanced reliability and availability and capable of connecting with a plurality of host computers having multiple different interfaces. A loop is provided to serve as a common loop channel having fiber channel interfaces. Host interface controllers (HIFC) connected to host computers having different interfaces permit conversion between the fiber channel interface and a different interface as needed. Control processors, shared by the host interface controllers, each reference FCAL (fiber channel arbitrated loop) management information to capture a frame having an address of the processor in question from among the frames passing through the loop. I/O processing is then carried out by the controller in accordance with a range of logical unit numbers (LUN) set in the captured frame.

37 Claims, 5 Drawing Sheets

U.S. PATENT DOCUMENTS

| | | | | |
|---|---|---|---|---|
| 5,274,783 | A | 12/1993 | House et al. | |
| 5,282,247 | A | 1/1994 | McLean et al. | |
| 5,297,268 | A | 3/1994 | Lee et al. | |
| 5,469,564 | A | 11/1995 | Junya | |
| 5,528,584 | A | 6/1996 | Grant et al. | |
| 5,533,125 | A | 7/1996 | Bensimon et al. | |
| 5,548,783 | A | 8/1996 | Jones et al. | |
| 5,579,474 | A | 11/1996 | Kakuta et al. | |
| 5,610,746 | A | 3/1997 | Ranalli | |
| 5,623,637 | A | 4/1997 | Jones et al. | |
| 5,630,129 | A | 5/1997 | Wheat | 718/105 |
| 5,644,789 | A | 7/1997 | Matthews et al. | |
| 5,651,139 | A | 7/1997 | Cripe et al. | |
| 5,657,445 | A | 8/1997 | Pearce | |
| 5,748,924 | A | 5/1998 | Llorens et al. | |
| 5,768,530 | A | 6/1998 | Sandorfi | |
| 5,768,623 | A | 6/1998 | Judd et al. | |
| 5,805,800 | A | 9/1998 | Kotani et al. | |
| 5,805,920 | A | 9/1998 | Sprenkle et al. | |
| 5,809,328 | A | 9/1998 | Nogales et al. | |
| 5,812,754 | A | 9/1998 | Lui et al. | |
| 5,835,496 | A | 11/1998 | Yeung et al. | |
| 5,848,251 | A | 12/1998 | Lomelino et al. | |
| 5,872,822 | A | 2/1999 | Bennett | |
| 5,894,481 | A | 4/1999 | Book | |
| 5,898,828 | A | 4/1999 | Pignolet et al. | |
| 5,913,227 | A | 6/1999 | Raz et al. | |
| 5,924,097 | A | 7/1999 | Hill et al. | 707/10 |
| 5,941,969 | A | 8/1999 | Ram et al. | |
| 5,941,972 | A | 8/1999 | Hoese et al. | |
| 5,996,014 | A | 11/1999 | Uchihori et al. | |
| 6,041,381 | A | 3/2000 | Hoese | |
| 6,061,753 | A | 5/2000 | Ericson | |
| 6,118,776 | A | 9/2000 | Berman | |
| 6,185,203 | B1 | 2/2001 | Berman | |
| 6,219,777 | B1 | 4/2001 | Inoue | |
| 6,223,205 | B1 | 4/2001 | Harchol-Balter et al. | 718/105 |
| 6,425,036 | B2 | 7/2002 | Hoese et al. | 710/129 |
| 6,484,245 | B1 | 11/2002 | Sanada et al. | 711/164 |
| 6,493,825 | B1 | 12/2002 | Blumenau et al. | 713/168 |
| 6,567,806 | B1 | 5/2003 | Tsuchida et al. | 707/7 |
| 6,581,136 | B1 | 6/2003 | Tuccio et al. | 711/114 |
| 6,604,155 | B1 | 8/2003 | Chong, Jr. | 710/56 |
| 6,615,314 | B1 | 9/2003 | Higaki et al. | |
| 6,684,274 | B1 | 1/2004 | Chong, Jr. | 710/56 |
| 6,725,293 | B1 | 4/2004 | Nakayama et al. | |
| 7,047,329 | B2 | 5/2006 | Nakayama et al. | |
| 7,099,962 | B2 | 8/2006 | Nakayama et al. | |
| 2003/0196002 | A1 | 10/2003 | Nakayama et al. | |
| 2004/0024930 | A1 | 2/2004 | Nakayama et al. | |

FOREIGN PATENT DOCUMENTS

| | | | |
|---|---|---|---|
| EP | 881560 | A2 | 12/1998 |
| EP | 0889403 | A2 | 7/1999 |
| JP | 63253448 | | 10/1988 |
| JP | 03105419 | | 5/1991 |
| JP | 03152650 | | 6/1991 |
| JP | 05143242 | | 6/1993 |
| JP | 05181609 | | 7/1993 |
| JP | 05225068 | | 9/1993 |
| JP | 05324445 | | 12/1993 |
| JP | 06095859 | | 4/1994 |
| JP | 06180690 | | 6/1994 |
| JP | 06214863 | | 8/1994 |
| JP | 6332632 | | 12/1994 |
| JP | 08115279 | | 5/1996 |
| JP | 08251101 | | 9/1996 |
| JP | 09160889 | | 6/1997 |
| JP | 10134485 | | 5/1998 |
| JP | 01181139 | | 7/1999 |
| JP | 11312058 | | 11/1999 |

FCAL MANAGEMENT INFORMATION 113

| CONTROL PROCESSOR NUMBER (201) | AL-PA (202) | LUN (203) |
|---|---|---|
| 114 | EF | 0—9 |
| 115 | E8 | 10—19 |
| 116 | E4 | 20—29 |
| 117 | E2 | 30—39 |

FIG. 5

FCAL MANAGEMENT INFORMATION 113

| CONTROL PROCESSOR NUMBER (201) | AL-PA (202) | LUN (203) |
|---|---|---|
| 114 | EF | 0—9 |
| 114 | E8 | 10—19 |
| 115 | — | — |
| 116 | E4 | 20—29 |
| 117 | E2 | 30—39 |

FIG. 6

FCAL MANAGEMENT INFORMATION 113

| CONTROL PROCESSOR NUMBER (201) | AL-PA (202) | LUN (203) |
|---|---|---|
| 114 | EF | 0—9 |
| 115 | — | — |
| 116 | E8 | 10—19 |
| 116 | E4 | 20—29 |
| 117 | E2 | 30—39 |

FIG. 7

FCAL MANAGEMENT INFORMATION 113

| CONTROL PROCESSOR NUMBER (201) | AL-PA (202) | LUN (203) |
|---|---|---|
| 114 | EF | 0—9 |
| 115 | E8 | 10—14 |
| 116 | E4 | 15—29 |
| 117 | E2 | 30—39 |

STORAGE SUBSYSTEM AND STORAGE CONTROLLER HAVING MEMORY WHICH STORES MANAGEMENT INFORMATION INDICATING CORRESPONDING RELATIONS BETWEEN PROCESSORS AND IDENTIFIES OF LOGICAL UNITS

The present application is a continuation of application Ser. No. 11/606,138, filed Nov. 30, 2006, now U.S. Pat. No. 7,461,245; which is a continuation of Ser. No. 10/941,960, filed Sep. 16, 2004, now U.S. Pat. No. 7,213,141; which is a continuation of application Ser. No. 10/418,360, filed Apr. 18, 2003, now U.S. Pat. No. 7,099,962; which is a continuation of application Ser. No. 09/608,151, filed Jun. 30, 2000, now U.S. Pat. No. 6,725,293, the contents of which are incorporated herein by reference.

BACKGROUND OF THE INVENTION

The present invention relates to a storage subsystem and a storage controller, both connected to host computers. More particularly, the invention relates to a storage subsystem and a storage controller adapted to provide enhanced performance and reliability.

DESCRIPTION OF THE RELATED ART

In recent years, storage controllers have been required to provide better performance, higher reliability and greater availability than ever before as computer systems are getting larger in scale to process data at higher speeds than ever before, 24 hours a day and 365 days a year, with data transfer interfaces also enhanced in speed. Illustratively, Japanese Patent Laid-open No. Hei 11-7359 discloses a storage controller incorporating an internal network to improve its performance.

There has been a growing need for connecting a storage controller to a plurality of host computers having multiple interfaces, as shown in FIG. 8. In such a storage controller, a host interface section comprises a host interface for addressing each different host computer. A control processor in each host interface analyzes I/O commands received from the corresponding host computer and exchanges data accordingly with a cache memory 215 over a signal line. Japanese Patent Laid-open No. Hei 9-325905 illustratively discloses one such storage controller.

Techniques have been known recently which substitute a fibre channel interface for the SCSI (Small Computer System Interface) between a host computer and a storage controller. Illustratively, Japanese Patent Laid-open No. Hei 10-333839 discloses techniques for connecting a storage controller with a host computer using a fibre channel interface. The disclosed storage controller is designed for dedicated use with a host computer having a fibre channel interface.

SUMMARY OF THE INVENTION

The techniques disclosed in the above-cited Japanese Patent Laid-open Nos. Hei 11-7359 and Hei 9-325905 have one disadvantage: the storage controller as a whole has its performance constrained by the performance of a single control processor that handles I/O requests from host computers. Another disadvantage is that a disabled control processor will prevent host computers from using the storage controller. In particular, since today's fibre channels are capable of transferring data at speeds as high as 100 MB/s, the performance of the control processor can be an impediment to taking advantage of the high data transfer rates offered by fibre channels.

The techniques disclosed in the above-cited Japanese Patent Laid-open No. Hei 10-333839 relate to a storage controller for exclusive use with fibre channel interfaces. That is, the proposed storage controller is incapable of connecting with a host computer having a SCSI interface.

It is therefore an object of the present invention to provide a storage subsystem and a storage controller adapted to take advantage of high data transfer rates of fibre channels while offering enhanced reliability and availability.

It is another object of the present invention to provide a storage subsystem and a storage controller capable of connecting with a plurality of host computers having multiple different interfaces.

In carrying out the invention and according to one aspect thereof, there is provided a storage subsystem or a storage controller for controlling transfer of input/output data to and from a lower level storage medium drive unit in response to input/output requests received from a higher level external entity. The storage subsystem or storage controller comprises: at least one external interface controller for receiving the input/output requests from the higher level external entity in accordance with a type of interface with the higher level external entity; at least one control processor which processes the input/output requests; and a loop of fibre channel interfaces interposed between the external interface controller and the control processor so as to serve as a channel through which information is transferred therebetween.

In a preferred structure according to the invention, the interface of the external interface controller interfacing to the higher level external entity may be a fibre channel interface. In another preferred structure according to the invention, the external interface controller may be capable of interface conversion between an interface which interfaces to the higher order external entity and which is different from a fibre channel interface on the one hand, and a fibre channel interface on the other hand.

Other objects, features and advantages of the invention will become more apparent upon a reading of the following description and appended drawings.

BRIEF DESCRIPTION OF THE DRAWINGS

FIG. 5 is a table depicting an example of FCAL management information 113 updated when control processors stopped;

FIG. 6 is a table indicating an example of FCAL management information 113 updated when an imbalance of control processor loads was detected;

FIG. 7 is a table showing another example of FCAL management information 113 updated when an imbalance of control processor loads was detected.

DESCRIPTION OF THE PREFERRED EMBODIMENTS

Preferred embodiments of this invention will now be described with reference to the accompanying drawings.

Figure 1:
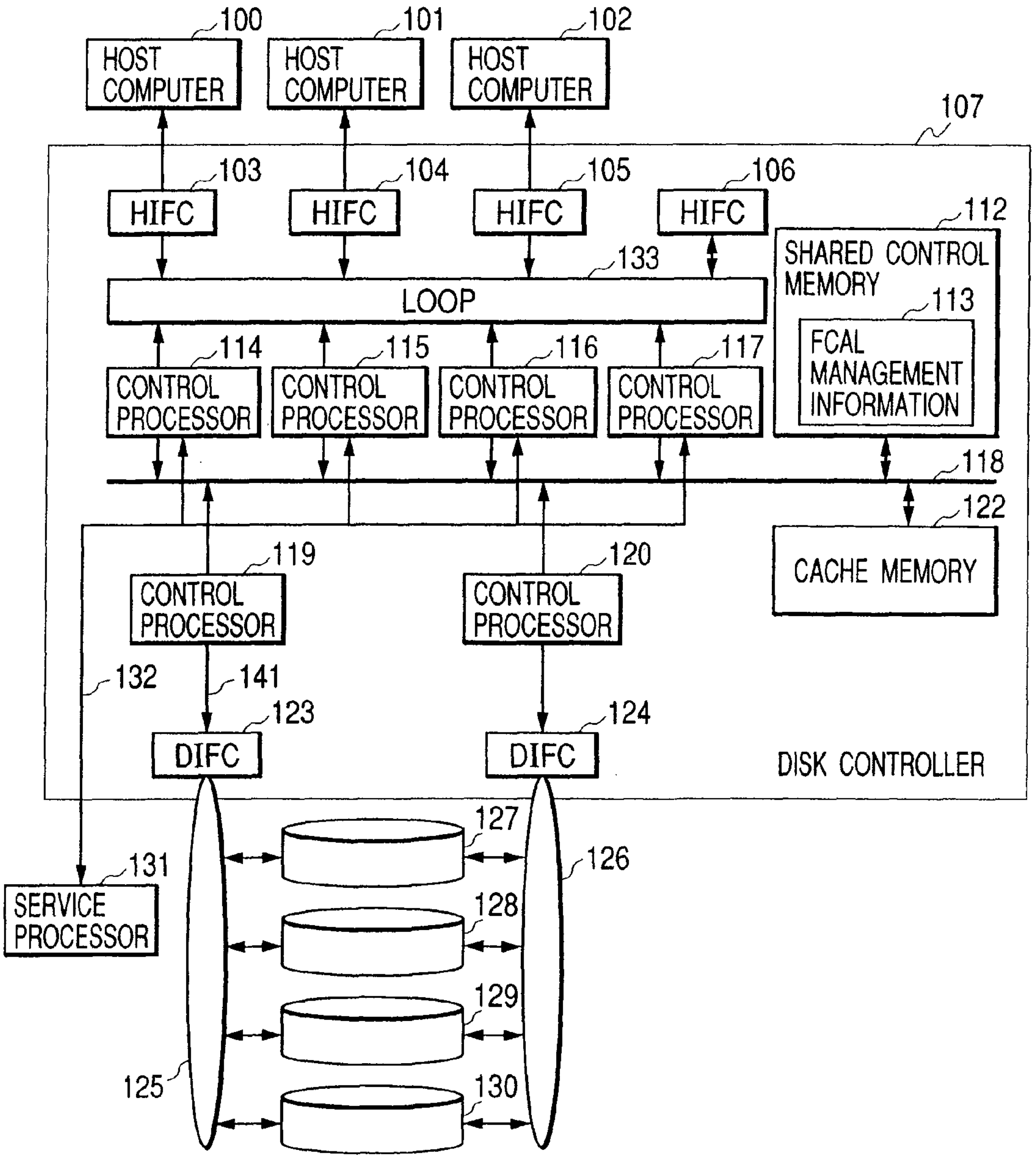
FIG. 1 is a block diagram of a storage subsystem practiced as an embodiment of the invention.

FIG. 1 is a block diagram of a system comprising a disk subsystem typically embodying the invention. A disk controller 107 is connected to host computers 100, 101 and 102 on the higher level side. The host computer 101 is a mainframe computer connected to the disk controller 107 through a mainframe channel. The host computer 100 is an open system computer connected to the disk controller 107 through a fibre channel interface. The host computer 102 is another open system computer connected to the disk controller 107 via a SCSI (Small Computer System Interface). The disk controller 107 is connected via loops 125 and 126 of fibre channel interfaces to drives 127, 128, 129 and 130 on the lower level side.

Host interface controllers (HIFC) 103, 104 and 105 are connected to the host computers 100, 101 and 102 respectively, as well as to a loop 133 of fibre channel interfaces. Control processors 114, 115, 116 and 117 are connected to the loop 133 on the one hand and to a common bus 118 on the other hand. The common bus 118 is connected not only to the controller processors 114 through 117 but also to a shared control memory 112, a cache memory 122, and control processors 119 and 120. The control processors 119 and 120 are connected via fibre channels 141 to drive interface controllers (DIFC) 123 and 124. The DIFCs 123 and 124 are connected to the drives 127, 128, 129 and 130 through the loops 125 and 126. The control processors 114, 115, 116 and 117 are connected to a service processor 131 by way of a signal line 132.

The HIFC 103 is an interface controller interfacing to a higher level external entity. Upon receipt of I/O commands, data and control information in the form of frames from the host computer 100, the HIFC 103 forwards what is received unmodified to one of the control processors 114 through 117 through the loop 133. On receiving data and control information in frames from any of the control processors 114 through 117 via the loop 133, the HIFC 103 transfers the data and information unmodified to the host computer 100. The HIFC 104 converts channel commands, data and control information received from the host computer 101 into fibre channel frame format for transfer to one of the control processors 114 through 117 via the loop 133. Upon receipt of data and control information in frames from any of the control processors 114 through 117, the HIFC 104 converts the received data and information into a data format compatible with a mainframe channel interface before transferring what is converted to the host computer 101. The HIFC 105 converts I/O commands, data and control information received from the host computer 102 into fibre channel frame format for transfer to one of the control processors 114 through 117. The HIFC 105 receives data and control information in frames from any of the control processors 114 through 117, and converts the received data and information into SCSI compatible data format for transfer to the host computer 102. It is possible to connect a plurality of host computers 100, 101, 102, etc., to each of the HIFCs 103, 104 and 105.

The cache memory 122 may be accessed by all control processors 114 through 117, 119 and 120 via a bus interface of the common bus 118. When in use, the cache memory 122 temporarily accommodates data sent from the host computers 100 through 102 as well as data retrieved from the drives 127 through 130. The data in the cache memory 122 are divided into data management units called cache slots.

The shared control memory 112 may be accessed by all control processors 114 through 117, 119 and 120 via the common bus 118. This memory has regions permitting communication between the control processors, and a cache slot management table, and stores FCAL (fibre channel arbitrated loop) management information 113 for establishing frames to be received through the loop 133 by each of the control processors 114 through 117. Each of the control processors 114 through 117 references the FCAL management information 113 in the shared control memory 112 to capture a frame having a relevant address from among the frames flowing through the loop 133, and executes an I/O request designated by a received I/O command. Upon receipt of a read command, the control processor reads the requested data if any from the cache memory 122, and sends the retrieved data to the requesting host computer through the loop 133 and via one of the HIFCs 103 through 105. If the requested data are not found in the cache memory 122, the control processor in question sends an I/O request to the control processors 119 and 120. Upon receipt of a write command, one of the control processors 114 through 117 writes target write data to a cache slot in the cache memory 122 and sends an I/O request to the control processors 119 and 120.

Figure 2:
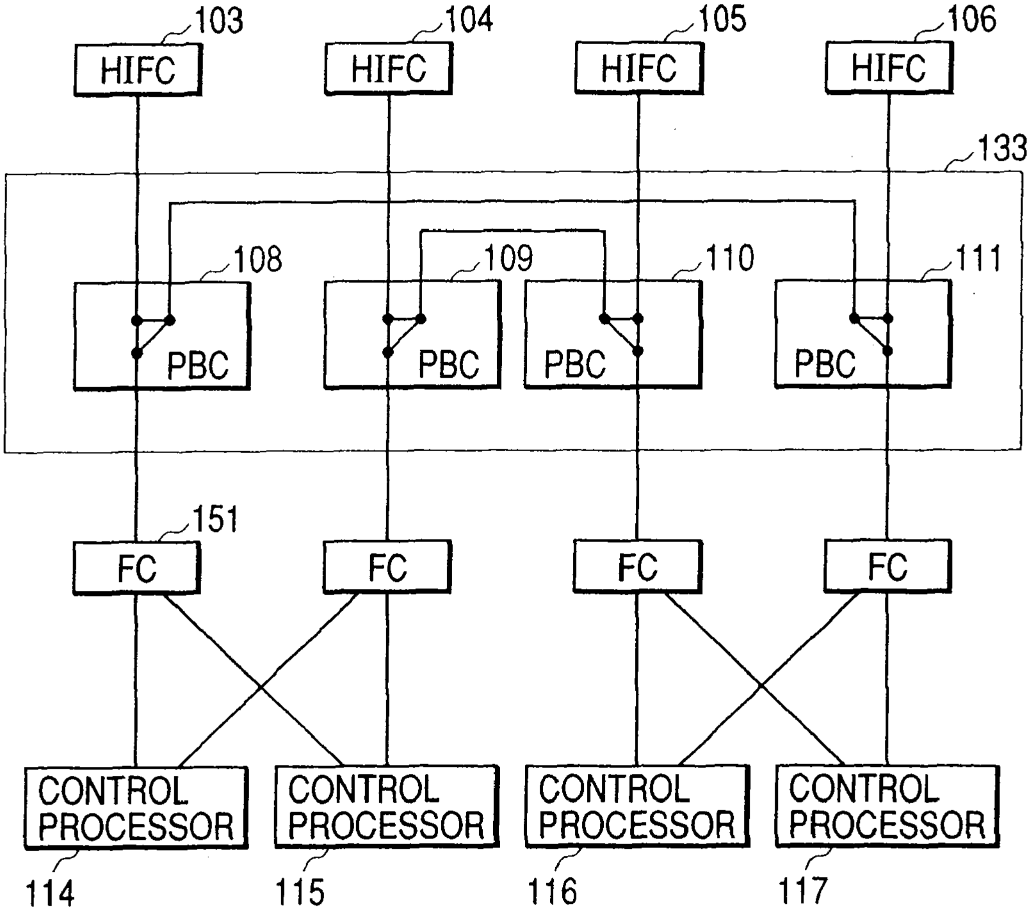
FIG. 2 is a block diagram of a loop 133 in the embodiment and related facilities.

The control processors 119 and 120 receive an I/O request from one of the control processors 114 through 117. If a read command is received, the control processors 119 and 120 read the requested data from the drives 127 through 130 and write the retrieved data to a cache slot in the cache memory 122. In the case of a write command, the control processors 119 and 120 write the relevant data from the cache memory 122 to the drives 127 through 130. FIG. 2 is a block diagram of the loop 133 interposed between the HIFCs 103 through 106 on the one hand and the control processors 114 through 117 on the other hand, along with facilities associated with the loop 133.

The loop 133 has port bypass circuits (PBC) 108, 109, 110 and 111 constituting what is known as a hub structure. The PBCs 108 through 111 are a one-input n-output electronic switch each. As illustrated, the PBCs 108 through 111 are connected to the HIFCs 103 through 106 and to the control processors 114 through 117. Interconnections are provided between the PBCs 108 and 111 as well as between the PBCs 109 and 110. In this embodiment, the PBCs 108 through 111 serve as a one-input two-output switch each. Feeding a suitable input signal to the PBC arrangement makes it possible to limit the number of output paths. Fiber controllers (FC) 151 disposed upstream of the control processors 114 through 117 recognize destination addresses of frames sent through the loop 133, capture a frame having a predetermined destination address, and transfer the captured frame to the relevant control processor connected. The fibre controllers 151 receive data and control information from the control processors 114 through 117, convert the received data and information into frame format data, and forward what is converted to the loop 133. With the HIFCs 103 through 106, FCs 151, and control processors 114 through 117 as its terminals, the loop 133 constitutes a topological loop transmission channel called a fibre channel arbitrated loop (FCAL). A fibre channel communication protocol is discussed illustratively in the published ANSI manual "FIBRE CHANNEL PHYSICAL AND SIGNALLING (FC-PH) REV. 4.3."

The PBC 108 is connected illustratively to the host computer 100 via the HIFC 103. In this setup, the PBC 108 is connectable to the control processors 114 and 115 as well as to the PBC 111. This means that an I/O request command from the host computer 100 may be processed by the control processor 114 or 115 via the PBC 108 or by the control processor 116 or 117 via the PBC 111. Likewise, an I/O request command from the host computer 101 may be processed by the control processor 114 or 115 via the PBC 109 or by the control processor 116 or 117 via the PBC 110.

This embodiment adopts a fibre channel interface for the fibre channels 141 as well as for the loops 125 and 126. Thus the FCs 151, not shown, are in fact interposed between the control processors 119 and 120 on the one hand and the fibre channels 141 on the other hand.

Figures 3, 4:
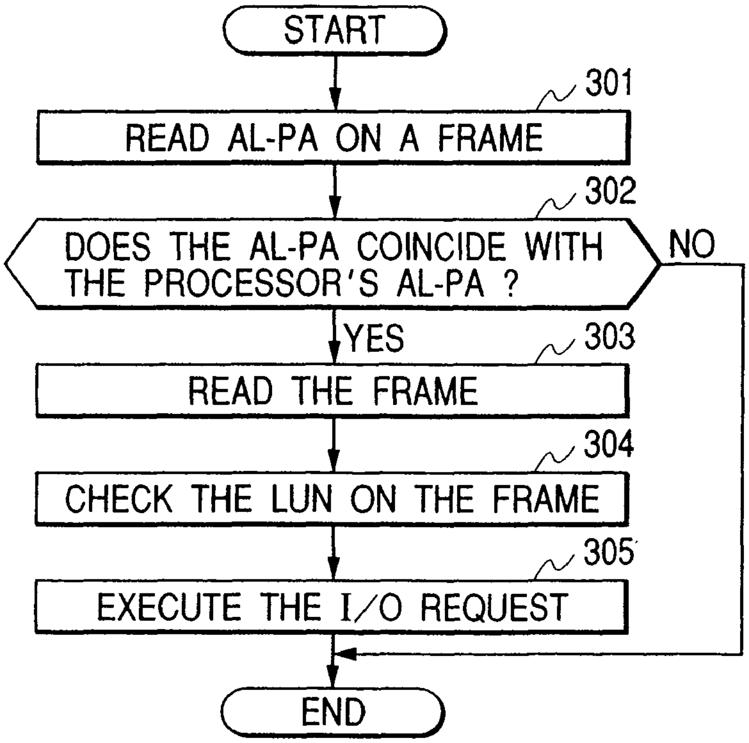
FIG. 3 is a table showing a data structure of FCAL management information 113 for use with the embodiment.
FIG. 4 is a flowchart of steps performed by control processors 114 through 117 of the embodiment.
Figure 8:
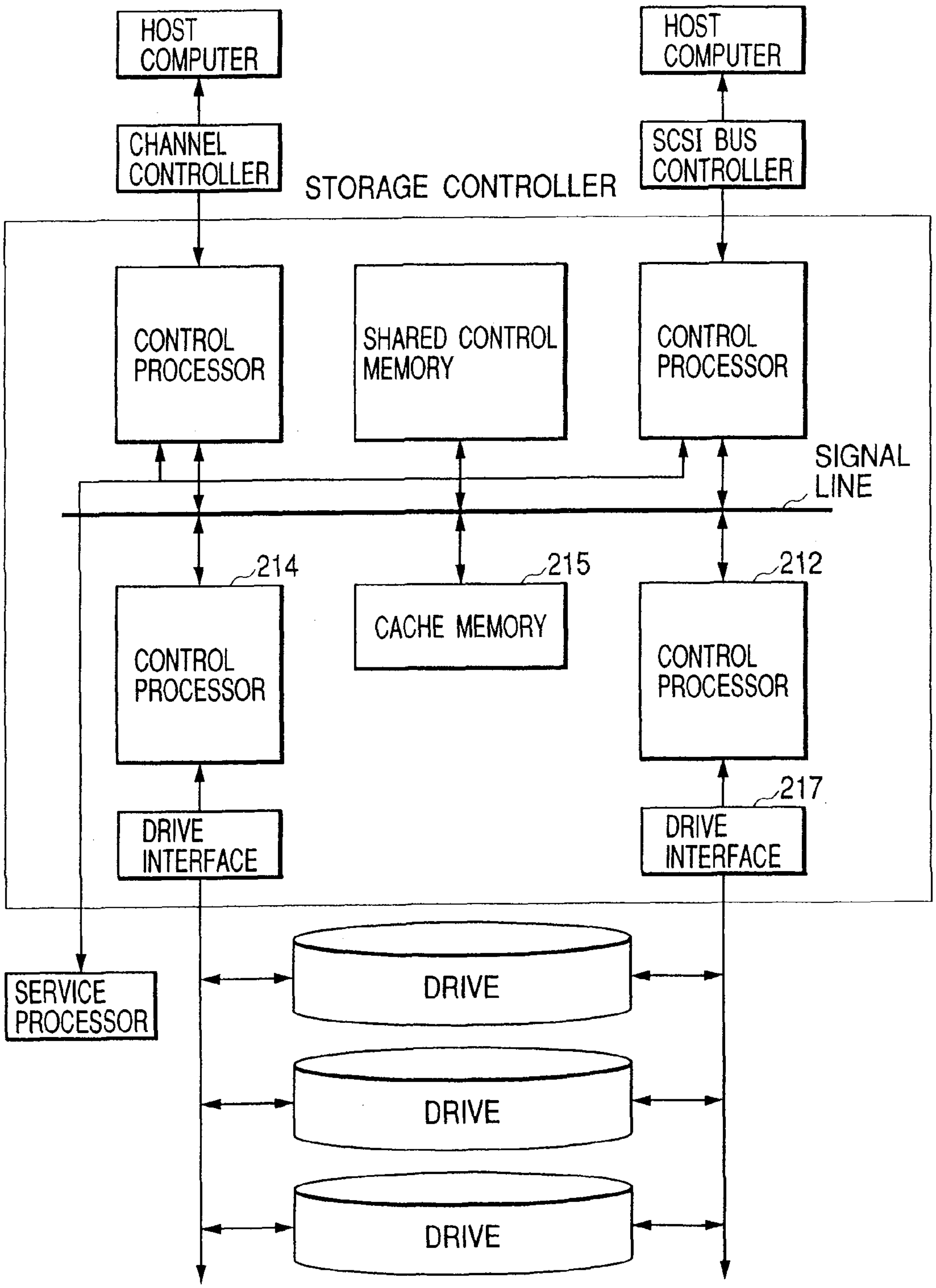
FIG. 8 is a block diagram of a conventional storage controller.

FIG. 3 is a table showing a data structure of the FCAL management information 113. The FCAL management information 113 constitutes a table in which frames to be captured by the control processors 114 through 117 via the loop 133 are set along with the range of device numbers subject to I/O processing. Entries making up the FCAL management information 113 include control processor numbers 201, AL-PAs (arbitrated loop physical addresses) 202, and LUNs (logical unit numbers) 203. A control processor number 201 is an identifier of any one of the control processors 114 through 117. An AL-PA 202 is an address assigned in the loop 133 to one of the control processors 114 through 117. A LUN 203 denotes a logical device number or a range of logical device numbers of devices whose I/O processing is carried out by a given control processor. The FCAL management information 113 may be set or canceled as instructed by the service processor 131.

FIG. 4 is a flowchart of steps performed by the control processors 114 through 117. Each of the control processors 114 through 117 periodically reads entries for the processor in question from the FCAL management information 113, and sets an AL-PA of the applicable processor to the connected FC 151. In case of a change, 13 the AL-PA is set again. The FC 151 reads AL-PAs in frames sent from the host computer 100 through the HIFC 103 and via the loop 133 (in step 301). If a given AL-PA is not found to be that of the connected control processor ("NO" in step 302), the processing is brought to an end. If an AL-PA is judged to be that of the connected control processor ("YES" in step 302), then the control processor in question is notified thereof. Given the notice, the applicable control processor (one of the processors 114 through 117) reads the frame via the FC 151 (in step S303). A check is made to see if the LUN of the I/O command in the frame falls within the range of the LUN 203 (in step 304). If the designated LUN does not fall within the range of the LUN 203, an error response is returned to the host computer 100. The control processor then effects an I/O request in accordance with the received I/O command (in step 305).

If the I/O request is a write request, the control processors 114 through 117 receive data from the host computer 100, write the received data to a suitable cache slot in the cache memory 122, and terminate the write request processing. The slot number of the cache slot to which to write the data is computed from an LBA (logical block address) attached to the data. That memory address in the cache memory 122 which corresponds to the slot number is obtained from the cache slot management table in the shared control memory 112. If the I/O request is a read request and if the requested data exist in the cache memory 122, the data are retrieved from the cache memory 122 and sent to the host computer 100 through the loop 133 and HIFC 103. The presence or absence of the target data is determined by referencing the cache slot management table. If the requested data are not found in the cache memory 122, a write request is written to an inter-processor liaison area in the shared control memory 112. When the target data are judged to have been placed into the cache memory 122, the data are read from the cache memory 122 and sent to the host computer 100.

The control processors 119 and 120 search the cache slots in the cache memory 122 for any data to be written to the drives 127 through 130. If such data are detected, they are written to the drives 127 through 130 via the fibre channels 141, DIFCs 123 and 124, and loops 125 and 126. The write operation is carried out in a manner asynchronous with any I/O request processing between the host computer 100 on the one hand and the control processors 114 through 117 on the other hand. The control processors 119 and 120 convert the designated LUN and LBA into a physical device number and a physical address to determine the target drive and the address in the drive for the eventual write operation. The control processors 119 and 120 then reference the inter-processor liaison area in the shared control memory 112 to see if there is any data read request. If any such read request is found, the relevant data are read from the applicable drive or drives 127 through 130 and written to the relevant cache slot in the cache memory 122. Suitable entries are then updated in the cache slot management table to reflect the presence of the data.

I/O requests to the drives 127 through 130 may be processed by any one of the control processors 119 and 120. For example, if the control processor 119 or the fibre interface loop 125 has failed and is unusable, the processing of I/O requests is taken over by the control processor 120 and fibre interface loop 126. If either of the control processors fails, I/O request processing is carried out without interruption of I/O operations to and from the drives 127 through 130.

The control processors 114, 115, 116 and 117 monitor one another for operation status. Specifically, each processor writes the current time of day to the shared control memory 112 at predetermined intervals. The times posted by each processor are checked periodically by the other control processors for an elapsed time. If there is no difference between the preceding and the current time posting, the control processor in question is judged to have stopped. A control processor that has detected the stopped processor receives management information about the failed processor from the FCAL management information 113 and takes over the processing of the incapacitated processor. Illustratively, suppose that the control processor 114 has found the control processor 115 stopped. In that case, the control processor 114 updates the FCAL management information 113 as shown in FIG. 5. The updates allow the control processor 114 to take over the I/O requests regarding the LUNs 10-19 that had been processed by the control processor 115.

Each of the control processors 114 through 117 counts the number of processed I/O requests and writes the counts to the shared control memory 112 at predetermined intervals. The control processors reference the processed request counts of one another to detect processors with inordinately high and low counts in order to average the counts therebetween. For example, suppose that the control processor 117 has found the control processor 116 with a falling processed request count and the control processor 115 with a rising request count. In that case, the control processor 117 updates the FCAL management information 113 as indicated in FIG. 6. It should be noted that relevant switch settings of the PBCs 108 through 111 need to be changed so that the frame with E8 in its AL-PA will be transmitted to the control processor 116 via the loop 133. The modifications allow the control processor 116 to process I/O requests with respect to the LUNs 10-19 and 20-29, whereby the processed request counts are averaged among the control processors to permit evenly distributed load processing.

Part of the LUNs 203 managed by a given control processor may be taken over by another control processor. For example, of the LUNs 10-19 managed by the control processor 115, solely the LUNs 15-19 may be taken over by the control processor 116. In that case, the FCAL management information 113 is updated as shown in FIG. 7. The control processors must inform the host computers 100, 101 and 102 of this change because the correspondence between the AL-PA 202 and LUN 203 is altered with regard to the LUNs 15-19.

The flow of processing by the control processors 114 through 117 has been described above with respect to the processing of I/O requests of the host computer 100 connected to the disk controller 107 via a fibre channel interface. Because the host computers 101 and 102 are connected to the disk controller 107 through interfaces different from the fibre channel interface, the HIFCs 104 and 105 convert I/O commands received from the host computers 101 and 102 into a frame format compatible with the fibre channel interface before sending the converted commands to the control processors 114 through 117 via the loop 133. These arrangements make the processing of I/O requests sent from the host computers 101 and 102 equivalent to that which has been discussed above.

The HIFC 104 has functions for effecting conversion between commands, control information and data complying with an interface called ESCON (Enterprise System Connection) on the one hand, and commands, control information and data pursuant to the fibre channel interface on the other hand. The HIFC 105 is capable of providing conversion between commands, control information and data complying with the SCSI on the one hand, and commands, control information and data in keeping with the fibre channel interface on the other hand. When the disk controller 107 incorporates HIFCs having such host interface converting functions, any host computer may be connected to the disk controller 107 regardless of the type of host interface in use.

Although the embodiment above has been shown involving the drives 127 through 130 as disk drives, this is not limitative of the invention. Alternatively, magnetic tape units or floppy disk drives may be connected by modifying the DIFCs 123 and 124. If the DIFCs are equipped with functions for effecting conversion between the SCSI and the fibre channel interface, the loops 125 and 126 may be replaced by SCSI cables.

The disk controller 107 of this embodiment allows any one of the control processors 114 through 117 to handle I/O requests sent from the host computer 100. If a large number of I/O requests are coming from the host computer 100 depending on the data transfer rate between the computer 100 and the HIFC 103 or through the loop 133, all of the control processors 114 through 117 can deal with the I/O requests. This provides a greater throughput than if fewer control processors were configured. Likewise, the I/O requests sent from the host computers 101 and 102 can be processed by any one of the control processors 114 through 117. When the host computers 100, 101 and 102 share the loop 133 and the control processors 114 through 117 in the manner described, it is possible for the inventive structure to have less lopsided load distribution among the components and ensure better performance of the storage controller as well as better cost/performance ratio than if the host computers 100, 101, 102, etc., have each an independent host interface connected to the common bus as in conventional setups.

As described, the storage controller according to the invention has its performance enhanced appreciably by having I/O requests from host computers processed in parallel by a plurality of control processors even as the processors have their loads distributed evenly therebetween. The invention is particularly conducive to making the most of high-speed fibre channel performance. The inventive storage controller is highly dependable because if any one of the control processors fails, the other processors take over the processing of the incapacitated processor.

The storage controller of the invention permits connection of multiple host computers having a plurality of kinds of interfaces, with the host computers sharing a fibre channel loop and control processors within the storage controller. This feature also promises excellent cost/performance ratio. Moreover, the storage controller permits connection of drives of different kinds of storage media.

As many apparently different embodiments of this invention may be made without departing from the spirit and scope thereof, it is to be understood that the invention is not limited to the specific embodiments thereof except as defined in the appended claims.

What is claimed is:

1. A storage controller for controlling data transfer between a plurality of storage devices and a plurality of host computers in response to input/output requests received from said plurality of host computers, said storage controller comprising:

a plurality of processors which execute said input/output requests; and a memory having management information indicating that at least one first processor of said plurality of processors is related to at least one first identifier of a logical unit of said plurality of storage devices, and at least one second processor of said plurality of processors is related to at least one second identifier of a logical unit of said plurality of storage devices, wherein the storage controller controls said at least one first processor to execute said data transfer related to said input/output requests for said at least one first identifier of a logical unit based on said management information, and wherein the storage controller controls said at least one second processor to execute said data transfer related to said input/output requests for said at least one second identifier of a logical unit based on said management information.

2. A storage controller according to claim 1, said storage controller further comprising:

a cache memory, wherein said at least one first processor reads requested data from said cache memory if said input/output requests for said at least one first identifier of a logical unit are read requests, and writes data to said cache memory if said input/output requests for said at least one first identifier of a logical unit are write requests, wherein said at least one second processor reads requested data from said cache memory if said input/output requests for said at least one second identifier of a logical unit are read requests, and writes data to said cache memory if said input/output requests for said at least one second identifier of a logical unit are write requests.

3. A storage controller according to claim 1, wherein said at least one first processor gives a notice to said at least one second processor, if said at least one first processor receives said input/output requests for said at least one second identifier of a logical unit while said at least one second identifier of a logical unit is related to said at least one second processor on said management information.

4. A storage controller according to claim 1, said storage controller further comprising:

a plurality of interface circuits for receiving said input/output requests from said plurality of host computers, wherein said at least one first processor executes said data transfer related to said input/output requests received through at least one first interface circuit of said plurality of interface circuits, and wherein said at least one second processor executes said data transfer related to said input/output requests received through said at least one first interface circuit.

5. A storage controller according to claim 1, wherein said storage controller monitors an amount of input/output requests processed by each of said plurality of processors.

6. A storage controller according to claim 1, wherein said storage controller has a first status and a second status, and under said first status in which said at least one first identifier of a logical unit is related to at least one first processor, wherein said data transfer related to said input/output requests for said at least one first identifier of a logical unit is executed by said at least one first processor, while, under said second status in which said at least one first identifier of a logical unit and said at least one second identifier of a logical unit are related to at least one first processor, wherein said data transfer related to said input/output requests for said at least one first identifier of a logical unit, and wherein said data transfer related to said input/output requests for said at least one second identifier of a logical unit are executed by said at least one first processor.

7. A storage controller according to claim 1, wherein said at least one first identifier of a logical unit and said at least one second identifier of a logical unit are at least one LUN.

8. A storage controller according to claim 6, wherein said storage controller changes said first status to said second status.

9. A storage controller according to claim 8, wherein said storage controller monitors an amount of input/output requests processed by each of said plurality of processors, and changes said first status to second status according to said amount of input/output requests processed by each of said plurality of processors.

10. A storage controller for controlling data transfer between a plurality of storage devices and a plurality of host computers in response to input/output requests received from said plurality of host computers, said storage controller comprising:

a plurality of processors which execute said input/output requests; and a memory having management information indicating said data transfer related to said input/output requests for at least one first identifier of a logical unit of said plurality of storage devices should be executed by at least one first processor of said plurality of processors, and said data transfer related to said input/output requests for at least one second identifier of a logical unit of said plurality of storage devices should be executed by at least one second processor of said plurality of processors.

11. A storage controller according to claim 10, said storage controller further comprising:

a cache memory, wherein said at least one first processor read requested data from said cache memory if said input/output requests for said at least one first identifier of a logical unit are read requests, and write data to said cache memory if said input/output requests for said at least one first identifier of a logical unit are write requests, wherein said at least one second processor read requested data from said cache memory if said input/output requests for said at least one second identifier of a logical unit are read requests, and write data to said cache memory if said input/output requests for said at least one second identifier of a logical unit are write requests.

12. A storage controller according to claim 10, wherein said at least one first identifier of a logical unit and said at least one second identifier of a logical unit are at least one LUN.

13. A storage controller according to claim 10, wherein said storage controller has a first status and a second status, and under said first status in which said at least one first identifier of a logical unit is related to at least one first processor on said management information, wherein said data transfer related to said input/output requests for said at least one first identifier of a logical unit is executed by said at least one first processor, while under said second status in which said at least one first identifier of a logical unit, wherein said at least one second identifier of a logical unit are related to said at least one first processor on said management information, wherein said data transfer related to said input/output requests for said at least one first identifier of a logical unit and said data transfer related to said input/output requests for said at least one second identifier of a logical unit are executed by said at least one first processor, and wherein said storage controller monitors an amount of input/output requests processed by each of said plurality of processors, and changes said first status to second status according to said amount of input/output requests processed by each of said plurality of processors.

14. A storage controller for controlling data transfer between a plurality of storage devices and a plurality of host computers in response to input/output requests received from said plurality of host computers, said storage controller comprising:

a plurality of processors which execute said input/output requests; and a memory which stores management information indicating corresponding relations between said processors and identifies of logical units, wherein said data transfer related to said input/output requests for at least one first identifier of a logical unit of said plurality of storage devices are executed by at least one first processor of said plurality of processors, and wherein said data transfer related to said input/output requests for at least one second identifier of a logical unit of said plurality of storage devices are executed by at least one second processor of said plurality of processors.

15. A storage controller according to claim 14, said storage controller further comprising:

a cache memory, wherein said at least one first processor read requested data from said cache memory if said input/output requests for said at least one first identifier of a logical unit are read requests, and write data to said cache memory if said input/output requests for said at least one first identifier of a logical unit are write requests, and wherein said at least one second processor read requested data from said cache memory if said input/output requests for said at least one second identifier of a logical unit are read requests, and write data to said cache memory if said input/output requests for said at least one second identifier of a logical unit are write requests.

16. A storage controller according to claim 14, wherein said at least one first identifier of a logical unit and said at least one second identifier of a logical unit are at least one LUN.

17. A storage controller according to claim 14, wherein said storage controller has a first status and a second status, and in said first status, said data transfer related to said input/output requests for said at least one first identifier of a logical unit is executed by said at least one first processor, while, in said second status, said data transfer related to said input/output requests for said at least one first identifier of a logical unit and said data transfer related to said input/output requests for said at least one second identifier of a logical unit are executed by said at least one first processor, and wherein said storage controller monitors an amount of input/output requests processed by each of said plurality of processors, and changes said first status to second status according to said amount of input/output requests processed by each of said plurality of processors.

18. A method for controlling a storage controller having a plurality of processors transferring data between a plurality of storage devices and a plurality of host computers in response to input/output requests received from said plurality of host computers, said method comprising:

a step for controlling at least one first processor of said plurality of processors to execute data transfer related to said input/output requests for at least one first identifier of a logical unit in said storage devices; and a step for controlling at least one second processor of said plurality of processors to execute data transfer related to said input/output requests for at least one second identifier of a logical unit in said storage devices, wherein a memory included in said storage controller stores management information indicating corresponding relations between said processors and identifies of logical units.

19. A method for controlling a storage controller according to claim 18, wherein said storage controller controls said plurality of processors based on said management information stored in said memory of said storage controller, and wherein said management information indicates that said at least one first processor is related to said at least one first identifier of a logical unit and at least one second processor is related to said at least one second identifier of a logical unit.

20. A method for controlling a storage controller according to claim 19, wherein said storage controller further comprising:

a cache memory, wherein said at least one first processor read requested data from said cache memory if said input/output requests for said at least one first identifier of a logical unit are read requests, and write data to said cache memory if said input/output requests for said at least one first identifier of a logical unit are write requests, and wherein said at least one second processor read requested data from said cache memory if said input/output requests for said at least one second identifier of a logical unit are read requests, and write data to said cache memory if said input/output requests for said at least one second identifier of a logical unit are write requests.

21. A method for controlling a storage controller according to claim 19, said method further comprising:

a step for giving a, notice to said at least one second processor by said at least one first processor, if said at least one first processor receives said input/output requests for said at least one second identifier of a logical unit while said at least, one second identifier of a logical unit is related to said at least one second processor on said management information.

22. A method for controlling a storage controller according to claim 19, wherein said storage controller has a plurality of interface circuits, said method further comprising:

a step for executing data transfer related to said input/output requests received through at least one first interface circuit of said plurality of interface circuits by said at least one first processor; and a step for executing data transfer related to said input/output requests received through said at least one first interface circuit by said at least one second processor.

23. A method for controlling a storage controller according to claim 19, said method further comprising:

a step for monitoring an amount of input/output requests processed by each of said plurality of processors.

24. A method for controlling a storage controller according to claim 19, wherein said storage controller has a first status and a second status, and under said first status in which said at least one first identifier of a logical unit is related to said at least one first processor, said data transfer related to said input/output requests for said at least one first identifier of a logical unit is executed by said at least one first processor, while under said second status in which said at least one first identifier of a logical unit and said at least one second identifier of a logical unit are related to at least one first processor, said data transfer related to said input/output requests for said at least one first identifier of a logical unit and said data transfer related to said input/output requests for said at least one second identifier of a logical unit are executed by said at least one first processor.

25. A method for controlling a storage controller according to claim 24, said method further comprising:

a step for changing said first status to said second status.

26. A method for controlling a storage controller according to claim 25, said method further comprising:

a step for monitoring an amount of input/output requests processed by each of said plurality of processors, and a step for changing said first status to second status according to said amount of input/output requests processed by each of said plurality of processors.

27. A method for controlling a storage controller according to claim 19, wherein said at least one first identifier of a logical unit and said at least one second identifier of a logical unit are at least one LUN.

28. A computer program stored on a memory within a storage controller having a plurality of processors transferring data between a plurality of storage devices and a plurality of host computers in response to input/output requests received from said plurality of host computers, said computer program comprising:

a program code for controlling at least one first processor of said plurality of processors to execute data transfer related to said input/output requests for at least one first identifier of a logical unit in said storage devices; and a program code for controlling at least one second processor of said plurality of processors to execute data transfer related to said input/output requests for at least one second identifier of a logical unit in said storage devices, wherein a memory included in said storage controller stores management information indicating corresponding relations between said processors and identifies of logical units.

29. A computer program according to claim 28, wherein said storage controller controls said plurality of processors based on said management information stored in said memory of said storage controller, and wherein said management information indicates that at least one of first processor is related to said at least one first identifier of a logical unit and at least one of second processor is related to said at least one second identifier of a logical unit.

30. A computer program according to claim 29, said storage controller further comprising:

a cache memory, wherein said at least one first processor read requested data from said cache memory if said input/output requests for said at least one first identifier of a logical unit are read requests, and write data to said cache memory if said input/output requests for said at least one first identifier of a logical unit are write requests, and wherein said at least one second processor read requested data from said cache memory if said input/output requests for said at least one second identifier of a logical unit are read requests, and write data to said cache memory if said input/output requests for said at least one second identifier of a logical unit are write requests.

31. A computer program according to claim 29, said computer program further comprising:

a program code for giving a notice to said at least one second processor by said at least one first processor, if said at least one first processor receives said input/output requests for said at least one second identifier of a logical unit while said at least one second identifier of a logical unit is related to said at least one second processor on said management information.

32. A computer program according to claim 29, wherein said storage controller has a plurality of interface circuits, said computer program further comprising:

a program code for executing data transfer related to said input/output requests received through at least one first interface circuit of said plurality of interface circuits by said at least one first processor; and a program code for executing data transfer related to said input/output requests received through said at least one first interface circuit by said at least one second processor.

33. A computer program according to claim 29, said computer program further comprising:

a program code for monitoring an amount of input/output requests processed by each of said plurality of processors.

34. A computer program according to claim 29, wherein said storage controller has a first status and a second status, and under said first status in which said at least one first identifier of a logical unit is related to said at least one first processor, said data transfer related to said input/output requests for said at least one first identifier of a logical unit is executed by said at least one first processor, under said second status in which said at least one first identifier of a logical unit and said at least one second identifier of a logical unit are related to said at least one first processor, said data transfer related to said input/output requests for said at least one first identifier of a logical unit and said data transfer related to said input/output requests for said at least one second identifier of a logical unit are executed by said at least one first processor.

35. A computer program according to claim 34, said computer program further comprising:

a program code for changing said first status to said second status.

36. A computer program according to claim 35, said computer program further comprising:

a program code for monitoring an amount of input/output requests processed by each of said plurality of processors, and a program code for changing said first status to said second status according to said amount of input/output requests processed by each of said plurality of processors.

37. A computer program according to claim 29, wherein said at least one first identifier of a logical unit and said at least one second identifier of a logical unit are at least one LUN.

* * * * *